United States Patent [19]

Rattan et al.

[11] Patent Number: 4,489,740
[45] Date of Patent: Dec. 25, 1984

[54] DISC CLEANING MACHINE

[75] Inventors: William D. Rattan; Craig M. Walwyn, both of San Jose, Calif.

[73] Assignee: General Signal Corporation, Stamford, Conn.

[21] Appl. No.: 453,370

[22] Filed: Dec. 27, 1982

[51] Int. Cl.³ .............................................. G11B 3/58
[52] U.S. Cl. ..................... 134/140; 134/33; 134/149; 360/137
[58] Field of Search ............... 134/140, 138, 149, 157, 134/33, 112; 369/270; 360/97-99; 346/137

[56] References Cited

U.S. PATENT DOCUMENTS

| | | | |
|---|---|---|---|
| 2,078,699 | 4/1937 | Taylor et al. | 141/9 |
| 2,652,350 | 9/1953 | Dailey | 134/23 |
| 2,839,307 | 6/1958 | Garrison et al. | 279/1 |
| 3,479,222 | 11/1969 | David et al. | 134/33 |
| 3,871,663 | 3/1975 | Stave | 369/270 |
| 4,001,892 | 1/1977 | Castelli et al. | 134/33 |
| 4,027,686 | 6/1977 | Shortes et al. | 134/33 |
| 4,064,885 | 12/1977 | Dussault et al. | 134/58 |
| 4,161,356 | 7/1979 | Griffin et al. | 134/149 |
| 4,161,356 | 7/1979 | Giffin et al. | 354/323 |
| 4,166,622 | 9/1979 | Rager | 369/270 |
| 4,202,071 | 5/1980 | Scharpf | 134/140 |

FOREIGN PATENT DOCUMENTS

| | | | |
|---|---|---|---|
| 86106 | 5/1982 | Japan | 369/270 |
| 103105 | 6/1982 | Japan | 369/270 |

Primary Examiner—John W. Shepperd
Assistant Examiner—Renee S. Kidorf
Attorney, Agent, or Firm—Thomas R. FitzGerald

[57] ABSTRACT

A cleaning machine for cleaning annular discs is disclosed. Annular discs of rigid or flexible material are designed to receive a magnetic coating capable of operating as a memory for a computer. The cleaning machine uses a spindle that aligns and holds the disc. The spindle rotates and high pressure cleaning fluid simultaneously washes both sides of the disc. In one embodiment the spindle has a conical ferrule made of abrasion-resistant rubber. In another embodiment the spindle includes centrifugally-operable hold down arms that extend from the spindle during rotation to keep the disc on the spindle.

13 Claims, 10 Drawing Figures

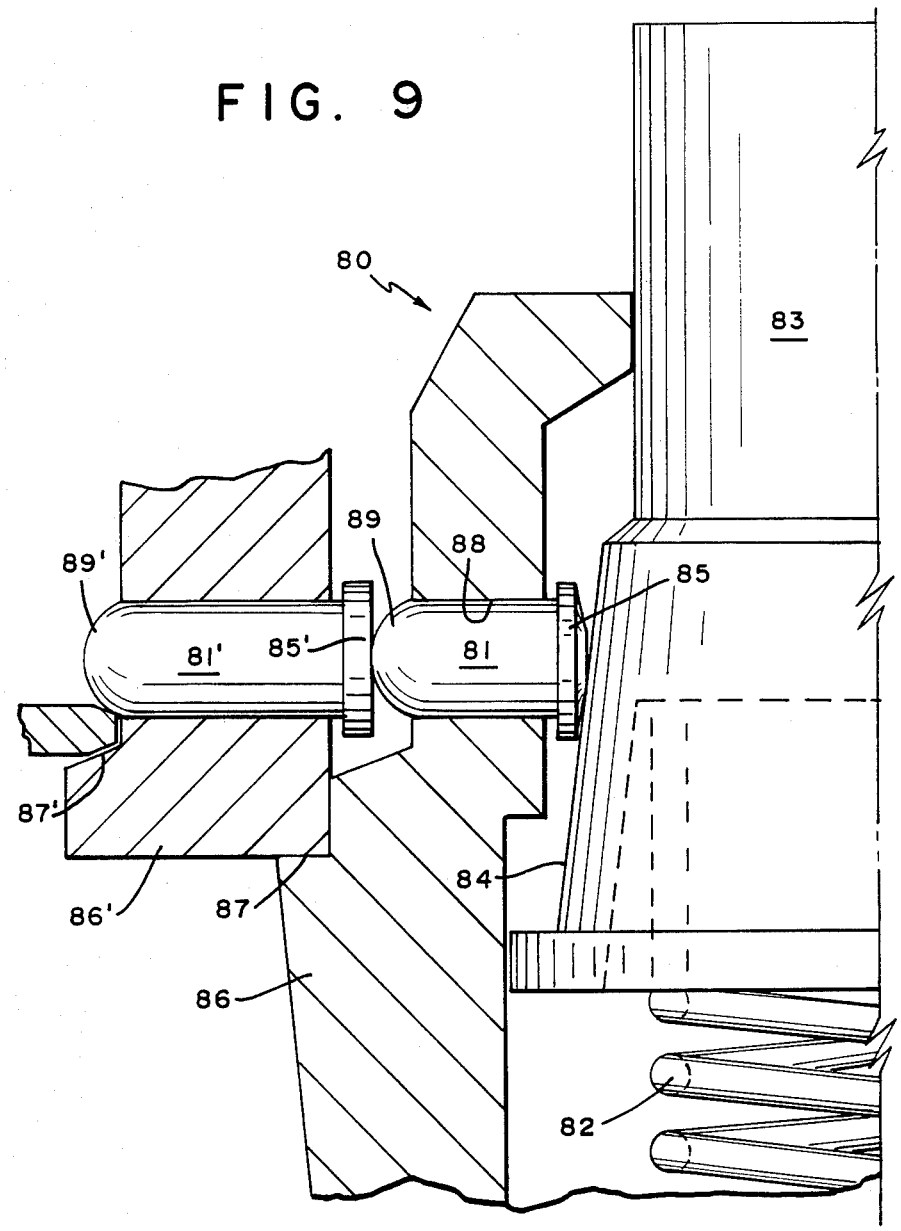

DISC CLEANING MACHINE

BACKGROUND

This invention relates to a cleaning machine, and in particular, a machine for cleaning annular discs suitable for use in Winchester or other disc drive memory systems.

A commonly-used memory system, known as a Winchester disc drive system, uses thin, annular metal discs coated with a memory receiving coating. It is typical that such discs are made of aluminum. The aluminum disc must be clean and free from dirt, oil, and other contaminants in order to properly accept a memory surface coating. Other discs of rigid or flexible (floppy) material also must be cleaned before they are coated.

In U.S. Pat. No. 3,479,222, there is described a cleaning apparatus for cleaning an annular metal memory disc previously coated with a memory layer. That patent describes a machine that uses rollers or wheels spaced about the periphery of the disc. The wheels orient and retain the disc and also turn the disc while cleaning fluid is applied to it. That patent does not indicate whether or not such a method and apparatus would be suitable for cleaning discs before they are coated with a memory coating.

It is also known that devices such as photomasks or semiconductor wafers can be cleaned and dried by mounting them on a vacuum chuck, spraying suitable cleansing fluid, such as dionized water, onto the device and spinning the device until it is dry. For examples of such apparatus, see U.S. Pat. Nos. 4,161,256; 4,064,885; and 4,027,686. Such apparatus would not, however, readily accept an annular disc member. This is so since such apparatus frequently use a spindle having a vacuum chuck disposed underneath the wafer or the photomask for holding the planar surface of the item on the spindle during operation. Since an annular disc has a central opening, a vacuum chuck would not be appropriate. Moreover, such apparatus only cleans one surface of the item at a time and it would be desirable to clean simultaneously both surfaces of the annular disc.

It has also been proposed by others to provide a spindle that has vacuum operated jaws which extend and grip the inside ring of the annular disc so that the disc can then be rotated. Such devices unfortunately have encountered problems. The mechanism needed to actuate gripping jaws through a central spindle is mechanically complex. Moreover, such devices have not been able to completely clean the discs and spin them dry since some water remains in crevices of the jaw mechanism.

A disc blank can be completely cleaned within 30 seconds if each side is subjected to a stream of dionized water at 2,500 to 5,000 psi while the disc was rotated between 2,500 to 5,000 revolutions per minute. In such a machine it would be desirable to minimize hand contact with the disc. Accordingly, it would be desirable to have a machine that self centered and aligned the disc into its proper horizontal plane of rotation. Since a high-pressure stream of water would be directed against both sides of the disc, some fail-safe means would be desired to hold the disc on the spindle in the event that the upper high pressure spray became clogged or otherwise inoperable. The latter condition would leave the disc under the influence of the lower spray that would tend to force the disc off the spindle. Should a disc rotating at such high speeds leave the spindle, damage to the cleaning machine could be considerable. In addition, any people in the immediate area could be injured if a rigid metal disc left the spindle. Of course, in any such cleaning machine, there must be some means for imparting the desired rotation to the disc.

SUMMARY

It is an object of this invention to fulfill the requirements mentioned above.

It is a further object of this invention to provide a machine for simultaneously cleaning both sides of an annular disc.

It is a further object of this invention to provide a disc cleaning machine that self aligns and centers the disc in a horizontal plane of rotation.

It is a further object of this invention to provide a spindle for a disc cleaning machine which holds the disc on the spindle by using the centrifugal forces developed by the rotation of the spindle and the disc.

In summary, the invention comprises a machine for cleaning surfaces of an annular disc. The machine has a housing containing a spindle for supporting and rotating a disc. A dispensing means includes nozzles disposed above and below the horizontal plane of rotation of the disc. The nozzles dispense cleansing fluid, such as dionized water, onto the opposite surfaces of the disc. The spindle has a tapered or reduced upper diameter proportion so that a disc having an inner diameter somewhat larger than the end of the spindle can be easily inserted onto the spindle. The other end of the spindle is rotatably connected to a suitable driving means for turning the spindle and the disc.

Carried on the spindle are means for holding the disc on the spindle and for imparting rotation of the spindle to the disc. In one embodiment of the invention, the means carried on the spindle is a ferrule made of abrasion-resistant rubber. In another embodiment of the invention, the spindle is equipped with a plurality of extensible arms. The arms are pivotally mounted in recesses provided in the spindle. Under rotation the arms are urged by centrifugal force out of their recesses and into engagement with the disc. The pivot point for each arm is disposed below the horizontal plane of rotation of the disc. The pivot point is radially spaced beyond the center of mass of the arm to facilitate loading and unloading of the disc.

BRIEF DESCRIPTION OF THE DRAWINGS

FIG. 9 is an enlarged partial view of FIG. 8.

DETAILED DESCRIPTION—PREFERRED EMBODIMENT

Figure 1:
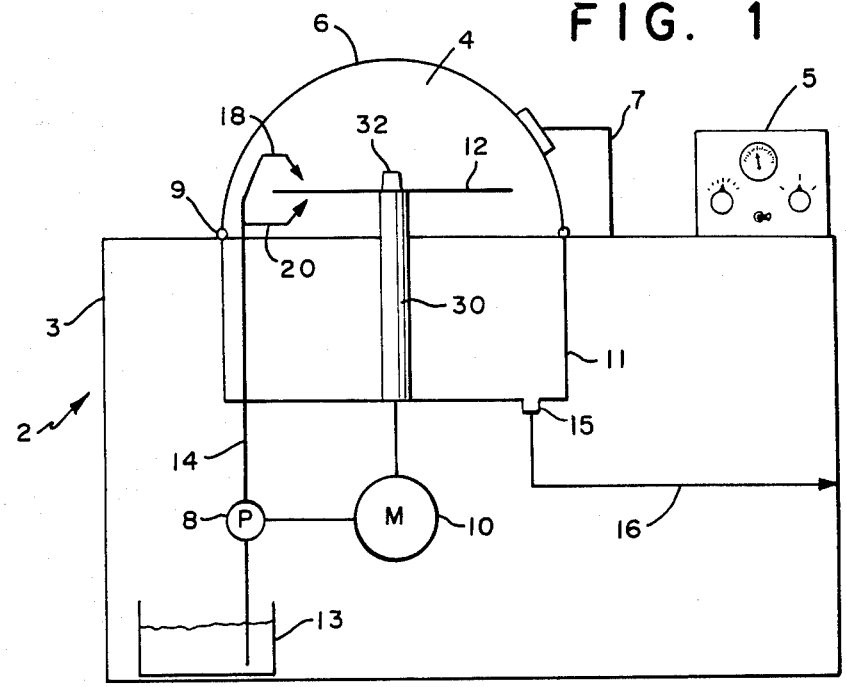
FIG. 1 is a schematic sectional view of a disc cleaning machine.

Refering to the drawings and in particular to FIG. 1, there is shown, in general, a disc cleaning machine 2. The cleaning machine 2 includes a cabinet 3 with suitable controls 5 for operating the machine 2 as further described herein. A cleaning chamber 4 has a translucent, shatter-resistant cover 6 having a general hemispherical shape and a circular seal 9. The cover 6 can be positioned over a basin 11 to contain any cleaning fluid entirely within the washing chamber 4. The chamber cover 6 is swingingly mounted on swivel arm 7.

Inside the machine 2 is a motor 10 that drives a variable displacement fluid pump 8 and also rotate a spindle 30. Suitable drive connections (not shown) between the motor 10 and the pump 8 and spindle 30 permit the motor to operate the spindle at speeds substantially higher than the speed of the pump 8. The pump 8 draws cleaning fluid such as dionized water from a reservoir 13. Those skilled in the art will recognize that the reservoir 13 may be located inside the machine 2 or may come from an independent source outside of the machine.

The pump 8 provides cleaning fluid via a feed line 14 to a pair of nozzles 18, 20 that are disposed inside the cleaning chamber 4. The two nozzles 18, 20 are positioned to spray cleaning fluid onto opposite sides of a disc 12 mounted on a spindle 30. Water shed from the disc 12 collects on the bottom of the basin 11, falls into a drain 15, and is removed from the machine 2 via a drain line 16.

Figure 2:
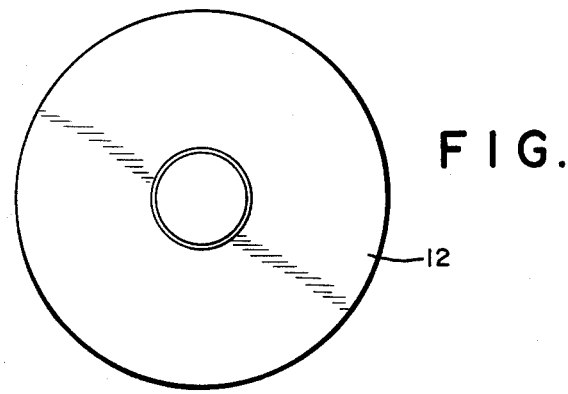
FIG. 2 is a planar view of an annular disc.

With reference to FIG. 2, there is shown a representation of a typical aluminum disc suitable for processing into a memory disc for a Winchester disc drive system. The disc 12 is a thin, annular, rigid metal article having an outside diameter of between 14 to 5.25 inches, and an inner diameter that varied between 6 to 1.5 inches. It is also noted that the inner annular portion of the disc is stepped or slightly tapered such that the disc is thinner at its inside diameter than it is on its outside diameter. The following description will refer to aluminum disc 12. However, those skilled in the art will realize that discs of other materials that are semi-rigid, or flexible (floppy) may also be cleaned on the inventive machine.

Figure 3:
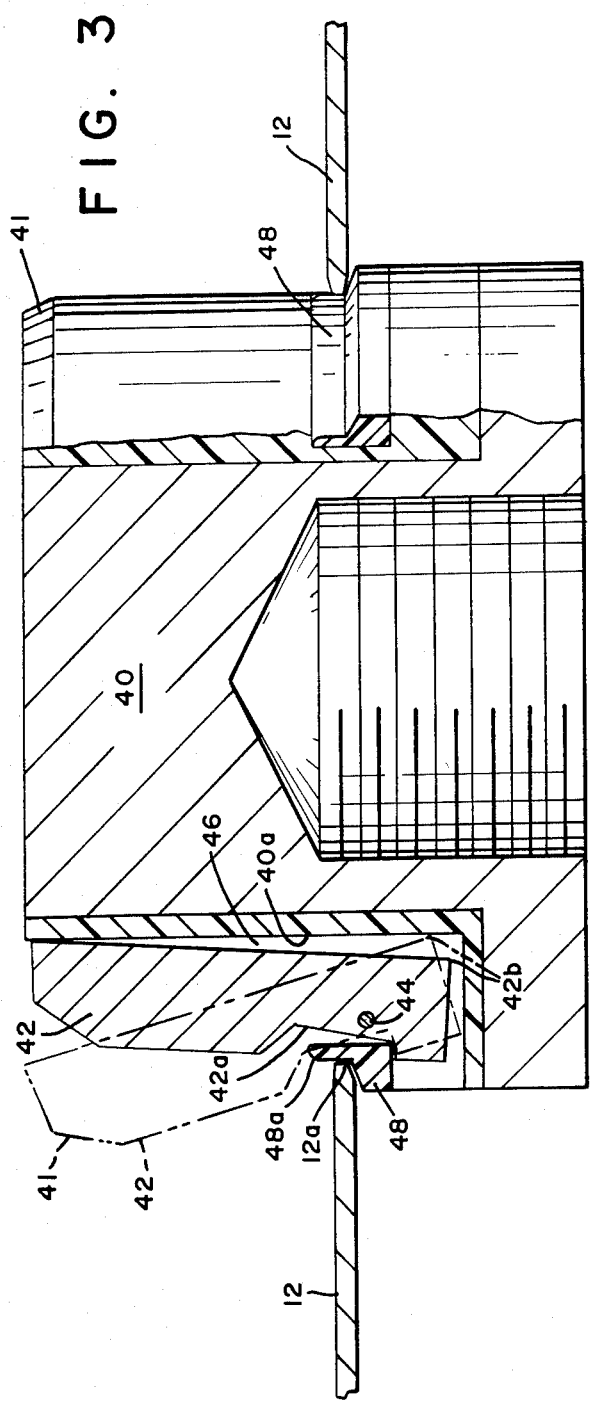
FIG. 3 is a partial enlarged sectional view of the spindle.
Figure 4:
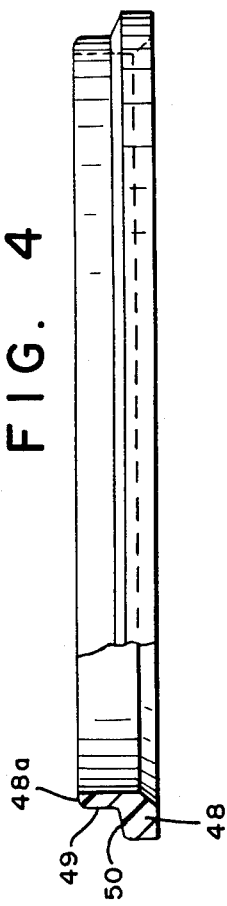
FIG. 4 is a sectional view of a friction ring.
Figure 5:
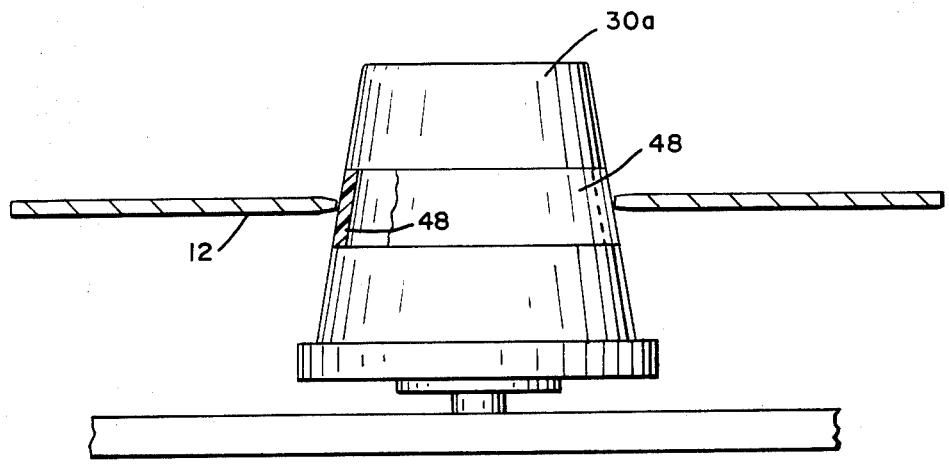
FIG. 5 is a view of one alternate embodiment.
Figure 10:
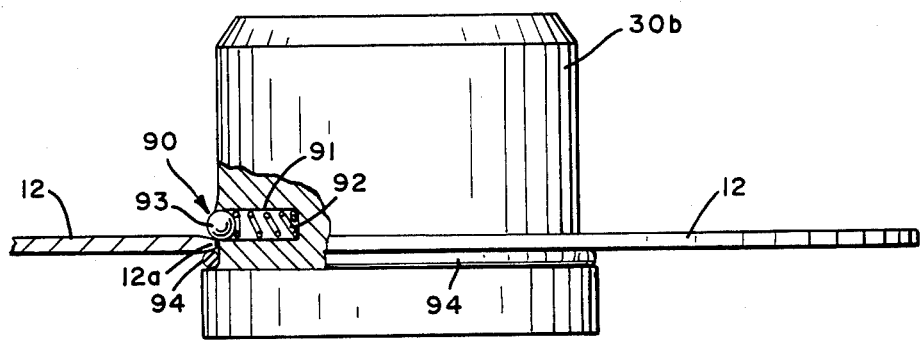
FIG. 10 is a view of a simple version of the embodiment of FIGS. 8, 9.
Figure 6:
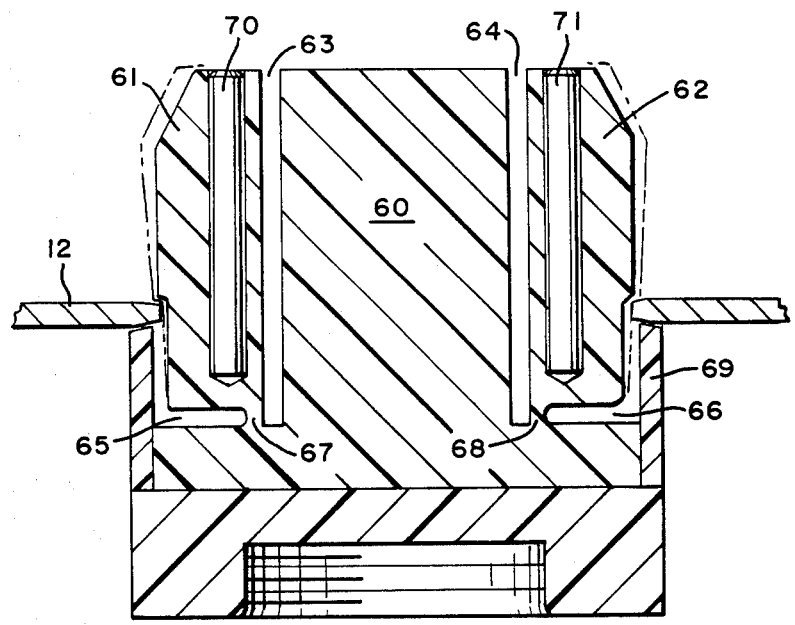
FIG. 6 is a sectional view of another alternate spindle embodiment.

Turning now to FIGS. 3 and 4, there is shown the spindle 30. On the upper end of the spindle 30 is a bushing 40. The bushing 40 has a reduced diameter end portion 41. The reduced diameter end portion 41 enables an operator to easily insert a disc over the spindle 30 inasmuch as the reduced diameter portion 41 is less than the inner diameter of the disc 12.

The bushing 40 carries a plurality, preferably three, of extensible arms 42 that are equidistantly circumferentially and radially spaced around the outer periphery of the bushing 40. Each arm 42 normally sits in a corresponding recess 46 and is rotatably mounted on a pivot 44. Each pivot 44 is disposed below the intended horizontal rotational plane of the disc 12 and radially beyond the radius of the center of mass of the arm 42. The latter feature facilitates the loading and unloading of a disc 12. As shown in FIG. 3, the arms 42 normally rest at an inclined angle on bushing 40. When a disc 12 is loaded, the inner annulus 12a easily passes over the retracted, inclined arms 42. After a cleaning operation, the arms 42 may remain extended as shown in phantom in FIG. 3. When the disc is lifted off the spindle 30, the inner annulus 12a will contact the arms and easily urge them into their retracted position.

The bushing 40 comprises a central core of stainless steel material having a threaded central blind bore suitable for threadingly engaging a threaded drive shaft. The outer portion of the spindle comprises a plastic material such as polyurethane or polypropolene in which the arms 42 are mounted. The arms 42 themselves can be made of any suitable non-abrasive material, preferably an acetal homopolymer sold under the tradename Delrin.

A stepped outside diameter friction ring 48 surrounds the outside diameter of bushing 40 in the intended horizontal plane of disc 12. The sloped outer wall 50 of ring 48 supports the disc 12 and frictionally couples the rotation of bushing 40 to disc 12. The ring 48 is made of any suitable elastomer material. It is sufficiently resilent such that the inner wall portion 49 expands under the centrifugal force of arms 48 to engage and hold disc 12 on spindle 40.

The arms 42 are inhibited from direct contact with the upper surface of disc 12. A lip portion 48a of friction ring 48 engages a notched, recessed surface 42a of arm 42 thereby cushioning the impact of the arms 22 on the disc 12. Corner 42b of arm 42 is sized to bear against vertical spindle surface 40a and thereby limit the movement of arm 42 about pivot 44.

In operation, a disc 12 is loaded onto a spindle 30 having a bushing 40 and the controls 5 are suitably set to start the machine. As the cycle begins, the motor 10 accelerates the spindle 3 to a desired rotational speed. Once at that speed, the high pressure pump 8 starts and the fluid is dispensed from the nozzles 18, 20 onto the disc 12. The nozzles are carried on a common, oscillating arm 22. The arm 22 reciprocally sweeps the nozzles 18, 20 back and forth across the path of the plane of the spinning disc.

When spindle 30 turns, centrifugal force acts upon the arms 42 and the arms 42 move out from their recesses 46 and assume the positions shown in phantom in FIG. 3. The arms 42 are thrown out with a significant centrifugal force and the inner wall 49 of elastomer ring 48 bends and absorbs the shock of the impact of the arms. That initial impact helps to center the disc on the spindle bushing 14, forcing the disc 12 down, and increasing the friction between the ring 48 and the disc 12 such that the rotation of the spindle and bushing 40 are suitably coupled to the disc 12. Thereafter, the disc accelerates to an operating speed of 2,500 to 5,000 rpms. All of the above happens in approximately 1.5 seconds for a five (5) inch disc and 2.5 seconds for an eight (8) inch diameter disc. Hence, the angular acceleration and angular momentum of the arms 42 is considerable.

The locations of arms 42 and pivots 44 and the ring 48 are suitably chosen to direct the centrifugal force acting on the arms 42 outwardly and downwardly toward the disc 12 for a number of reasons. The outward and downward forces increase the friction coupling between the disc 12 and the ring 48. Slippage between the disc 12 and ring 48 is minimized nd disc 12 is rapidly brought up to desired speed. Those same forces also help to self-align the disc in the event that the disc 12 is loaded onto a spindle 30 in a cocked or non-horizontal position. The outward and downward directed forces further help keep the disc 12 engaged in the event that one or more of the arms 42 become stuck or otherwise fail to move. The disc 12 is subject to impact forces of the cleaning fluid, so the outward and downward centrifugal forces of the arms 42 help keep the disc on the spindle 30 if the upper nozzle 18 becomes clogged. The unbalanced upwardly directed force of the lower nozzle 20 would tend to lift the disc 12 off the spindle 30. So, the arms 42 provide a fail-safe operation in the event upper nozzle 18 fails.

Once the disc 12 is accelerated to its desired angular speed, a cleansing fluid such as dionized water is ejected from the nozzles 18 and 20 at a desired pressure level. Nozzles 18, 20 oscillate to track the discharged fluid along an arcuate path that intersects opposite surfaces of disc 12. Pressures on the order of 2,500 to 5,000 psi and spindle speeds of 2,500 to 5,000 rpm are suitable for cleaning disc 12.

FIRST ALTERNATE EMBODIMENT—FIG. 5

It is also possible to use the invention without hold down arms 42. In a simplified version, the spindle 40 has a conical or tapered spindle 30a. The ring 48 is of any suiable, resilient, abrasion-resistant material such as polyurethane. If a disc 12 is placed upon the ring 48 at an angle other than horizontal, the ring 48 will hold and self center the disc 12 as the spindle 30 is turned. When the spindle 30 is initially rotated, the cocked disc 12 will take an initial slightly eccentric path. The eccentric path taken by the disc 12 will generated unbalanced centrifugal forces on the disc 12. These forces will act to raise the lower portion of the disc and lower the raised portion of the disc until the disc assumes a stable, horizontal plane.

SECOND ALTERNATE EMBODIMENT—FIGS. 6, 7

A monolithic or one-piece bushing 60 made from a single piece of suitable material, such as polypropolene. A pair of diametrically opposed arms 61, 62 are formed by cutting latitudinal cuts 63, 64 in the bushing. A pair of partial circumferential cuts 65, 66 provide arms 61, 62 with integral hinges 67, 68. Steel dowels 70, 71 are set into arms 61, 62 to increase the mass of arms 61, 62 and thus increase the induced circumferential forces. A friction ring 69 supports the disc 12 and couples the rotary motion of bushing 60 to disc 12. The friction ring 69 may also be integral with the bushing 60 or suitable fixed thereto. In operation, the centrifugal forces on arms 61, 62 and the steel dowels 70, 71 force the arms 61, 62 radially outward. Hinges 67, 68 redirect the outward forces down toward disc 12. Thus bushing 60 operates much like bushing 40.

THIRD ALTERNATE EMBODIMENT—FIGS. 8, 9

Figure 7:
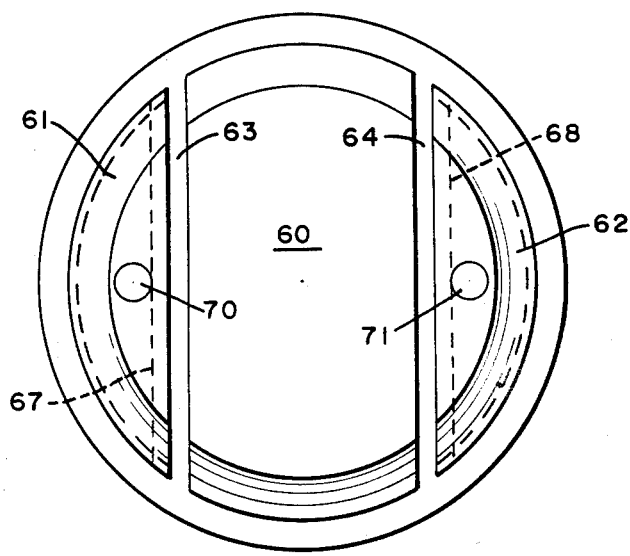
FIG. 7 is a planar view of FIG. 6.
Figure 8:
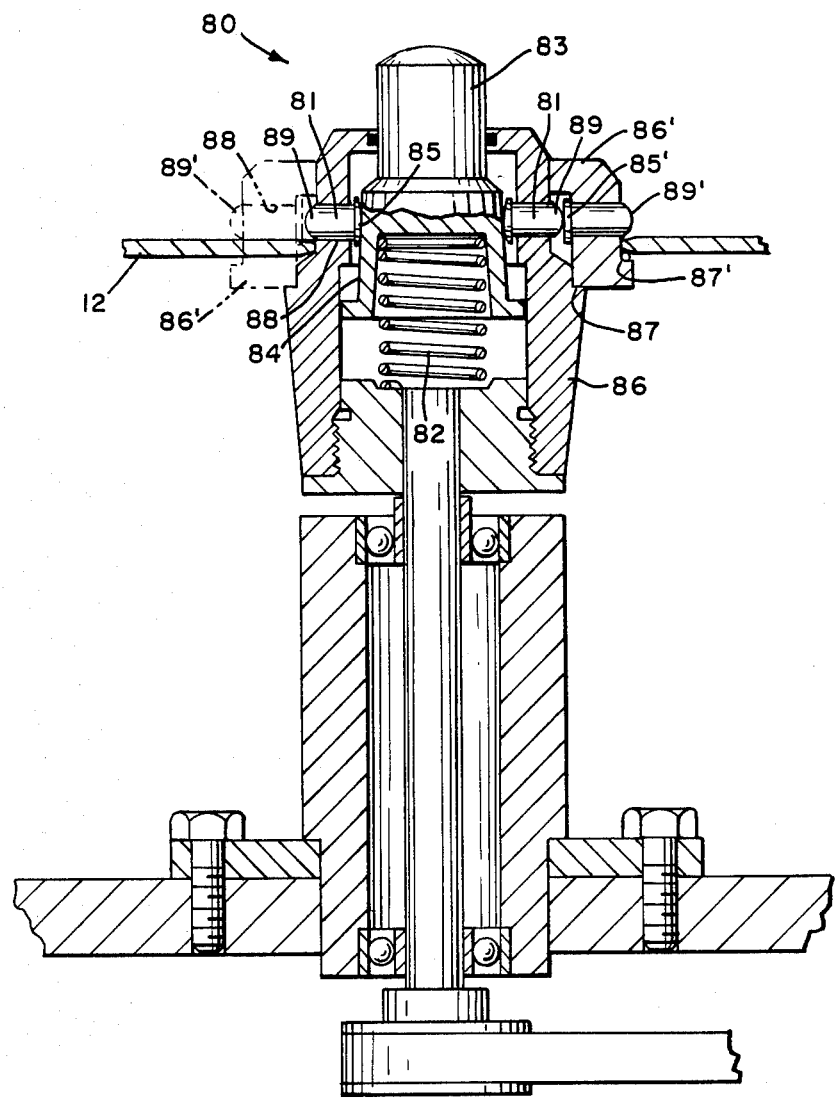
FIG. 8 is a sectional view of another spindle embodiment.

FIGS. 7, 8 show a bushing 80 with a plurality of spring biased ball detents 81 that replace hold down arms 42 or 61, 62. A spring 82 contained inside a thimble 83 upwardly biases the thimble 83. A frustro conical wall 84 acts as a cam against detent sliding bearing 85. A stepped outer sleeve 86 provides an annular friction surface 87 for supporting either a rigid disc 12 or a larger diameter adapter sleeve 86'. The sleeve 86 has a plurality of apertures 88 in registration with ball ends 89 of ball detents 81.

When the thimble 83 is depressed, spring 82 contracts. Ball detents move radially inward to provide clearance for the inner diameter of a disc 12 or an adapter sleeve 86'. When the thimble 83 is released, the conical wall 84 is urged against detent bearings 85 and urges the ball detents radially outward to extend through apertures 88. The ball ends 89 of extended detents 81 engage either the upper surface of the inner periphery of disc 12 or bear against detent bearings 85' in adapter sleeve 86'. The adapter sleeve is similarly provided with a friction surface 87'. In this embodiment, the ball ends 89, 89' and friction surfaces 87, 87' may be of any suitable elastomer material.

FOURTH ALTERNATE EMBODIMENT—FIG. 10

A more simple detent-operated hold down system uses a spindle 30b having a plurality (preferably three) ball detents 90. A cavity 91 in spindle 30b holds a spring 92. Detents balls 93 are radially outwardly biased by springs 92. A disc 12 rests on a friction ring 94 which couples the rotation of spindle 30b to disc 12. The detent balls 93 are axially spaced from friction ring 94 to secure the inner annulus 12a between detent balls 93 and friction ring 94. Loading and unloading of disc 12 causes detent balls 93 to move against springs 92 and into cavities 91 until the disc clears the balls 93.

Having thus described the preferred embodiment and three alternate embodiments of the invention, those skilled in the art will recognize that further embodiments of this invention are possible without departing from the spirit and scope of the invention as defined in the following claims.

We claim:

1. A machine for cleaning a surface of an annular disc having an inner annular surface of a predetermined diameter, comprising:
    a dispenser for dispensing a stream of cleaning fluid onto one or both surfaces of an annular disc,
    rotational drive means,
    a spindle for holding and rotating a disc through a dispensed stream of cleaning fluid, the spindle having one end rotatably fixed to the housing and the other end having a tapered surface configuration with a terminal diameter less than the diameter of the disc and gradually increasing in diameter in the direction of the rotatable end said tapered surface so configured to receive and support a disc along the inner annular surface of the disc, and
    means carried on the spindle and adapted to impart the rotational movement and to direct at least a portion of the centrifugal force of the rotating spindle toward the disc for holding the disc on the spindle as the disc is rotated, impacted and cleaned with dispensed cleaning fluid.

2. The invention of claim 1 wherein the dispensing means comprises at least two nozzles adapted to simultaneously dispense fluid against opposite surfaces of the disc.

3. The machine of claim 1 wherein the spindle comprises a first outer friction ring disposed below the intended plane of rotation of the disc and a first plurality of retractable detents disposed above the plane of the disc for engaging a disc and holding the disc between the detents and the friction ring.

4. The machine of claim 3 further comprising a stepped adapted having a second plurality of detents registrable with said first plurality of detents, an inner surface adapted to rest on said first outer friction ring and an outer surface with a second friction ring.

5. The machine of claim 1 wherein the means carried on the spindle comprises a ring of resilient friction material.

6. The machine of claim 5 wherein the ring is of an elastomeric material.

7. The machine of claim 6 wherein the elastomeric material is an abrasive resistant substance for resisting abrasion due to the impacting fluid and the inner annulus of the disc.

8. The machine of claim 1 wherein the means carried on the spindle comprises a bushing of resilient material having a plurality of extensible arms fashioned from circumferential, axial sections of the bushing and extended by centrifugal force to hold the disc on the spindle.

9. The machine of claim 8 wherein the bushing further comprises a corresponding plurality of integral hinges each for resiliently connecting one end of an arm to the bushing.

10. The machine of claim 9 wherein each arm further comprises a centrifugal weight for increasing the centrifugal force of the arm on a disc.

11. The machine of claim 1 wherein the spindle comprises a plurality of recesses and a corresponding plurality of extensible arms mounted in the recess and extended by centrifugal force to engage and hold the disc on the spindle.

12. The machine of claim 11 wherein the arms are pivotally mounted in the recesses and the axes of pivot are in a plane below the plane of the disc.

13. The machine of claim 11 wherein the means carried on the spindle includes a ring of resilient friction material and each extensible arm engages a portion of an inner wall of the friction ring and, during rotation, expands that portion against the inner annular surface of the disc.

* * * * *